(No Model.)
W. FLYNN.
STONE SAWING MACHINE.
No. 386,532. Patented July 24, 1888.
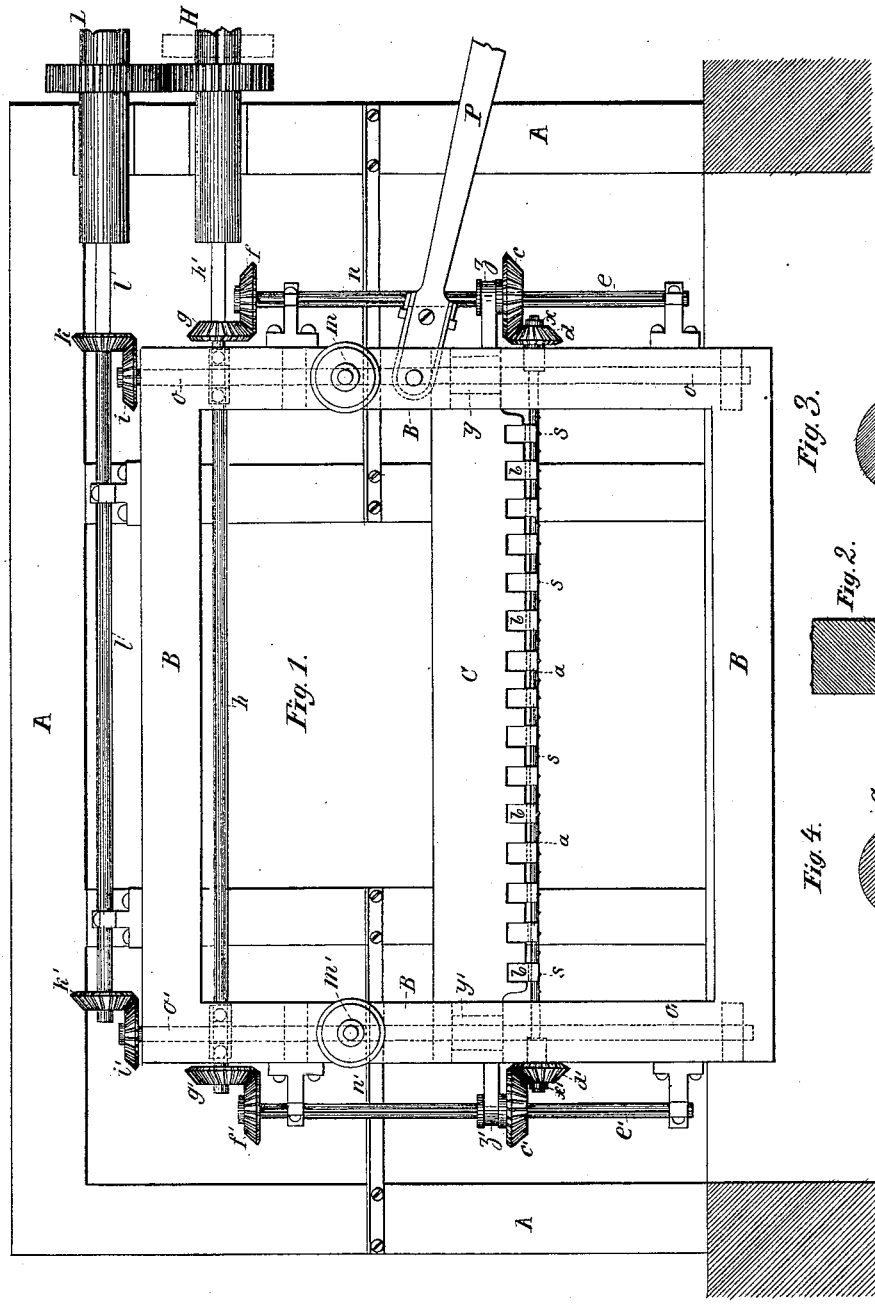
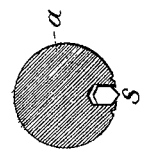
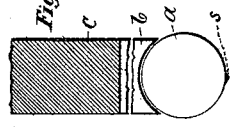
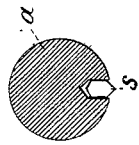
Witnesses
B. von Bültzingslöwen
F. W. Rubien
Inventor
William Flynn
By Singer & Ebner,
Attorneys

UNITED STATES PATENT OFFICE.

WILLIAM FLYNN, OF NEW YORK, N. Y., ASSIGNOR OF ONE-HALF TO THADDEUS A. JACKSON, OF SAME PLACE.

STONE-SAWING MACHINE.

SPECIFICATION forming part of Letters Patent No. 386,532, dated July 24, 1888.

Application filed September 17, 1887. Serial No. 249,973. (No model.)

*To all whom it may concern:*

Be it known that I, WILLIAM FLYNN, a citizen of the United States, residing at the city of New York, in the county of New York and State of New York, have invented a new and useful Improvement in Stone-Sawing Machines, of which the following is a specification.

The nature of the invention consists in the combination, with the reciprocating saw of a stone-sawing machine, of a rod extending through the whole length of the edge of said saw, running in bearings attached to said saw, as hereinafter fully described, and armed with diamond-bort and similarly hard material, which, while revolving around its own axis, moves lengthwise with said saw in its reciprocating motion, and, being guided thereby, becomes the cutting-edge thereof.

The nature of the invention also consists in the details of combination and construction substantially as illustrated in the drawings, hereinafter described, and subsequently pointed out in the claim.

Figure 1 is a side view, in elevation, illustrating a part of a stone-sawing machine constructed according to my invention. Fig. 2 is a detail view, in section, illustrating the connection of the saw and its cutting-surface, more fully hereinafter to be described. Figs. 3 and 4 are sectional details illustrating how the cutting-diamonds are fastened.

A designates the stationary frame of the saw; B, the reciprocating saw-sash; C, the blade of the saw, and P the pitman by which motion is communicated from the driving-crank to the saw-sash. As the said crank forms no part of my invention, it is not here illustrated. This saw is mounted and strained in the usual and well-known way and fed down and withdrawn by feed-screws $o$ $o'$, working in nuts $y$ $y'$ in the common and well-known way. The lower edge of this saw is cut with a series of notches, in which are placed the plates $b$ $b$. These plates extend a little beyond the edge of the saw and are each grooved, as illustrated in Fig. 2, the direction of the groove being parallel to the blade of the saw. The cylindrical rod $a$, which is mounted in bearings upon the sash B, revolves in the series of short grooves formed in the edges of the plates $b$, as illustrated in section in Fig. 2, so that the groove in each of said plates $b$ forms a smooth bearing for said cylindrical rod $a$ to run in. The diamonds may be either cast in this rod, as illustrated in Fig. 4, or fastened by compressing the outer edge of the hole in which they are set, as illustrated in Fig. 3. The grooves in the plates $b$, in which the rod $a$ revolves, act as so many guides to keep the rod in position while it is in motion, and, as the rod $a$ rotates and the saw C moves in its reciprocating motion, carrying the revolving rod with it, hold the rod steadily against the stone, so that it becomes the cutting-edge of the saw. The shafts $e$ and $e'$ are mounted in convenient bearings, one on each side of the saw-sash. Upon these shafts are mounted the bevel-wheels $c$ and $c'$. These wheels have each a groove upon its hub, extending all around the hub, which are embraced by the arms $z$ and $z'$, which arms are rigidly attached to the feed-nuts $y$ and $y'$, so that when the saw is moved upward or downward by the motion of the feed-nuts the wheels $c$ and $c'$ are carried with it. A key in each hub runs in a longitudinal groove in the shaft on which it is mounted. These wheels $c$ and $c'$ mesh into the wheels $d$ and $d'$, which are mounted on the ends of the rod $a$, and on account of the motion just described these wheels are kept in constant engagement with each other. Rotary motion is communicated to this mechanism by the shaft $h$, which is journaled in suitable bearings on the saw-sash B and moves with said sash in its reciprocating motion. The end $h'$ of this shaft, which is a four-sided prism, is adapted to a similarly-formed boss in the sleeve H, and moves back and forth therein as carried by the saw-sash B in its reciprocating motion. The sleeve H is turned by the power to which it may be connected in any common and well-known way. Upon the shaft $h$ are mounted the bevel-wheels $g$ and $g'$. These mesh into the bevel-wheels $f$ and $f'$ on the shafts $e$ and $e'$, and thus motion is transmitted from the power, through the shaft $h$, the bevel-wheels $g$ $g'$ $f$ $f'$, the shafts $e$ $e'$, and the bevel-wheels $c$ $c'$ and $d$ $d'$, to the rod $a$. If the rod $a$ should stretch or swag a little, it may be strained up by turning the nuts $x$ and $x'$, which are adapted to work on the ends of said rod.

The whole device is to be as illustrated in the drawings.

This invention is to be used as stone-sawing machines of its class usually are.

I am aware that heretofore a flat or square rod of metal twisted and mounted in bearings upon the reciprocating sash of a stone-sawing machine has been used for the cutting-edge of a stone-saw by causing said twisted rod to make alternate revolutions in opposite directions, and using it in connection with sand and water. I do not claim such a construction; but What I do claim, and desire to secure by Letters Patent, is—

The combination, with the reciprocating saw of a stone-sawing machine and bearing-plates, substantially as specified, fastened at convenient distances along the edge of said saw, of a cylindrical rod extending through the whole length of the edge of said saw, mounted in bearings on the sash of said saw, running in bearings in said bearing-plates upon the edge of said saw, armed with diamond-bort and similarly hard material, revolving continuously in one direction around its own axis, moving lengthwise with said saw in its reciprocating motion, and, being guided by the said saw and the said bearing-plates in the edge thereof, forming the cutting-edge of said saw, substantially as and for the purpose set forth.

In witness whereof I hereunto set my hand in presence of two witnesses.

WILLIAM FLYNN.

Witnesses:
   B. VON BÜLTZINGSLÖWCEY,
   F. W. RUBIEN.